United States Patent
Saiuchi et al.

(10) Patent No.: US 8,905,623 B2
(45) Date of Patent: Dec. 9, 2014

(54) TWO-SHAFT EXTRUDER WITH SCREW BLADE CONTACT PREVENTING MECHANISM

(75) Inventors: Shigeto Saiuchi, Sanda (JP); Makoto Irie, Kakogawa (JP)

(73) Assignee: Moriyama Company Ltd., Hyogo (JP)

(*) Notice: Subject to any disclaimer, the term of this patent is extended or adjusted under 35 U.S.C. 154(b) by 971 days.

(21) Appl. No.: 12/933,937

(22) PCT Filed: Nov. 26, 2008

(86) PCT No.: PCT/JP2008/071418
§ 371 (c)(1),
(2), (4) Date: Dec. 27, 2010

(87) PCT Pub. No.: WO2009/125514
PCT Pub. Date: Oct. 15, 2009

(65) Prior Publication Data
US 2011/0091596 A1 Apr. 21, 2011

(30) Foreign Application Priority Data

Apr. 8, 2008 (JP) ................................. 2008-100645

(51) Int. Cl.
| | | |
|---|---|---|
| *B29B 7/72* | (2006.01) | |
| *B29C 47/40* | (2006.01) | |
| *B29C 47/08* | (2006.01) | |
| *B29C 47/60* | (2006.01) | |
| *B29C 47/92* | (2006.01) | |
| *B29C 47/00* | (2006.01) | |

(52) U.S. Cl.
CPC ........... *B29C 47/402* (2013.01); *B29C 47/0801* (2013.01); *B29C 47/6012* (2013.01); *B29C 47/92* (2013.01); *B29C 47/0009* (2013.01); *B29C 47/0803* (2013.01); *B29C 2947/92076* (2013.01); *B29C 2947/92095* (2013.01); *B29C 2947/9239* (2013.01); *B29C 2947/92571* (2013.01); *B29C 2947/9259* (2013.01); *B29C 2947/92885* (2013.01); *B29C 2947/92952* (2013.01)
USPC .............................................. 366/83; 366/100

(58) Field of Classification Search
USPC ..................... 366/69–91, 100; 425/200–209; 198/661, 671
See application file for complete search history.

(56) References Cited

U.S. PATENT DOCUMENTS

| 363,953 | A | * | 5/1887 | Alexis-Godillot | ............ | 198/661 |
| 617,735 | A | * | 1/1899 | Godfrey | ........................ | 366/76.5 |

(Continued)

FOREIGN PATENT DOCUMENTS

| DE | 3420918 A1 * | 12/1985 | .............. B29C 47/38 |
| DE | 3545339 A1 * | 7/1987 | .............. B65G 33/26 |

(Continued)

*Primary Examiner* — Charles Cooley
(74) *Attorney, Agent, or Firm* — The Webb Law Firm

(57) ABSTRACT

In a two-shaft extruder, a pair of rotor shafts (1) is rotatably arranged such that the closer to the head end of the pair, the smaller the distance between the pair. The pair of rotor shafts (1) is respectively provided with screw blades (2) mounted on the head end side of the pair. The rotor shafts (1) are adapted such that one screw blade (2a) enters gaps of the other screw blade (2b). Drive devices (M) for rotationally driving the pair of rotor shafts (1) are mounted on the respective base ends of the pair. The extruder has a screw blade contact prevention mechanism (SS) which, when the pair of rotor shafts (1) is driven, prevents the pair from having a phase difference greater than a predetermined level.

5 Claims, 6 Drawing Sheets

(56) References Cited

U.S. PATENT DOCUMENTS

| | | | | |
|---|---|---|---|---|
| 970,240 | A * | 9/1910 | Kilborn | 209/247 |
| 2,041,619 | A * | 5/1936 | Steele | 366/75 |
| 2,466,934 | A * | 4/1949 | Dellenbarger | 425/182 |
| 3,314,660 | A * | 4/1967 | Arbiter | 366/289 |
| 3,325,864 | A * | 6/1967 | Kohyama et al. | 366/83 |
| 3,605,188 | A * | 9/1971 | McCormick et al. | 425/205 |
| 3,734,472 | A * | 5/1973 | Strohmeier | 366/76.4 |
| 3,782,700 | A * | 1/1974 | Wittrock | 366/76.4 |
| 4,047,705 | A * | 9/1977 | Hanslik | 366/85 |
| 4,408,888 | A * | 10/1983 | Hanslik | 366/83 |
| 4,764,020 | A * | 8/1988 | Moriyama | 366/76.4 |
| 4,773,763 | A * | 9/1988 | Weber | 366/83 |
| 5,103,689 | A | 4/1992 | Dollhopf | |
| 5,232,280 | A * | 8/1993 | Moriyama | 366/83 |
| 5,310,256 | A * | 5/1994 | Boden | 366/77 |
| 5,415,473 | A * | 5/1995 | Nakano et al. | 366/83 |
| 5,558,433 | A * | 9/1996 | Gheorghita | 366/76.4 |
| 5,565,219 | A * | 10/1996 | Hatanaka et al. | 425/145 |
| 5,628,560 | A * | 5/1997 | Eigruber | 366/83 |
| 5,700,885 | A * | 12/1997 | Pham et al. | 525/534 |
| 5,782,560 | A * | 7/1998 | Hatanaka et al. | 366/298 |
| 5,803,597 | A * | 9/1998 | Giani | 366/83 |
| 5,817,346 | A * | 10/1998 | Nakano | 425/186 |
| 5,836,681 | A * | 11/1998 | Giani | 366/83 |
| 5,843,489 | A * | 12/1998 | Nakano | 425/208 |
| 5,855,830 | A * | 1/1999 | Abe | 264/40.1 |
| 6,129,450 | A * | 10/2000 | Braun | 366/83 |
| 6,609,819 | B2 * | 8/2003 | Hauck et al. | 366/85 |
| 6,638,051 | B2 * | 10/2003 | Yamaguchi et al. | 425/204 |
| 6,688,217 | B2 * | 2/2004 | Hauck et al. | 100/117 |
| 6,881,049 | B2 * | 4/2005 | Nesbitt | 425/112 |
| 7,185,559 | B2 * | 3/2007 | Schmeink et al. | 74/665 H |
| 7,322,738 | B2 * | 1/2008 | Yamane et al. | 366/75 |
| 7,556,419 | B2 * | 7/2009 | Colombo | 366/77 |
| 7,632,006 | B2 * | 12/2009 | Schulz | 366/78 |
| 8,328,993 | B2 * | 12/2012 | Feerer et al. | 202/118 |
| 2003/0112698 | A1 * | 6/2003 | Hauck et al. | 366/85 |
| 2003/0116034 | A1 * | 6/2003 | Hauck et al. | 100/127 |
| 2003/0210605 | A1 * | 11/2003 | Hauck et al. | 366/87 |
| 2005/0219943 | A1 * | 10/2005 | Yamane et al. | 366/77 |
| 2005/0226093 | A1 * | 10/2005 | Yada et al. | 366/71 |
| 2006/0272518 | A1 * | 12/2006 | Babbini | 100/145 |
| 2007/0159916 | A1 * | 7/2007 | Colombo | 366/83 |
| 2007/0190198 | A1 * | 8/2007 | Ka et al. | 425/205 |
| 2009/0040867 | A1 * | 2/2009 | Schulz | 366/301 |
| 2011/0091596 | A1 * | 4/2011 | Saiuchi et al. | 425/376.1 |
| 2011/0123659 | A1 * | 5/2011 | Matsumoto et al. | 425/147 |

FOREIGN PATENT DOCUMENTS

| | | | | |
|---|---|---|---|---|
| DE | 3920422 | A1 * | 1/1991 | B29B 7/48 |
| EP | 41641 | A2 * | 12/1981 | A23P 1/00 |
| EP | 1543930 | A2 | 6/2005 | |
| GB | 1431330 | | 4/1976 | |
| JP | 55049134 | A * | 4/1980 | B01F 7/02 |
| JP | 55051543 | A * | 4/1980 | B29F 3/02 |
| JP | 57-150553 | | 9/1982 | |
| JP | 60154030 | A * | 8/1985 | B29C 47/38 |
| JP | 61206715 | A * | 9/1986 | B65G 33/14 |
| JP | 62064505 | A * | 3/1987 | B29B 11/10 |
| JP | 03-181640 | A | 8/1991 | |
| JP | 07-164508 | | 6/1995 | |
| JP | 08174543 | A * | 7/1996 | B29B 7/60 |
| JP | 09-164578 | A | 6/1997 | |
| JP | 09-174662 | A | 7/1997 | |
| JP | 2000-225641 | | 8/2000 | |
| JP | 2002355879 | A * | 12/2002 | B29C 47/64 |
| WO | WO 2005039847 | A1 * | 5/2005 | B29B 7/20 |
| WO | 2007059547 | A1 | 5/2007 | |

* cited by examiner

Fig. 3
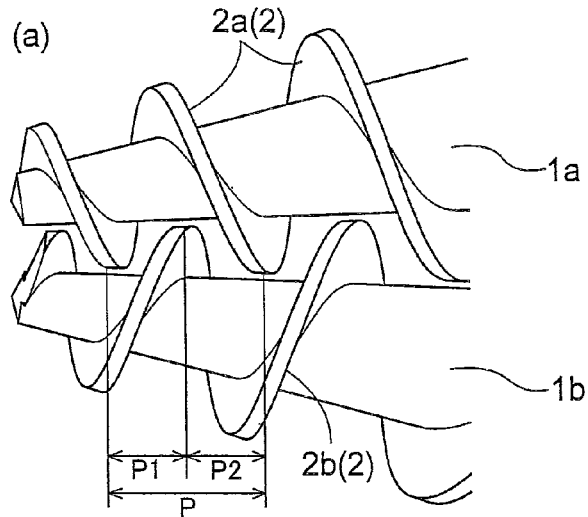
(a)
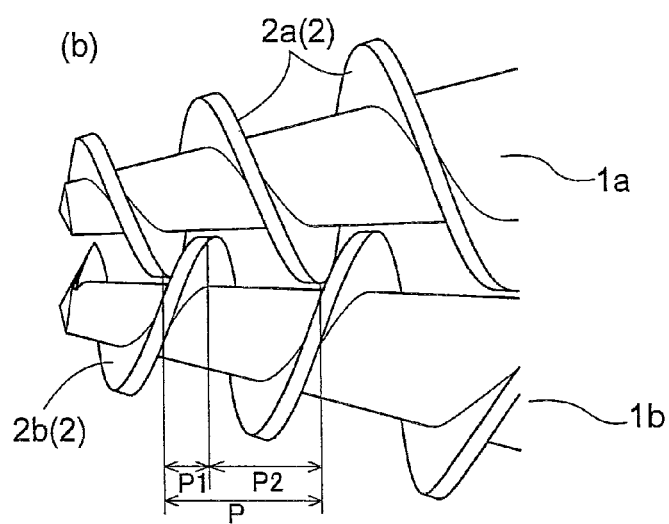
(b)
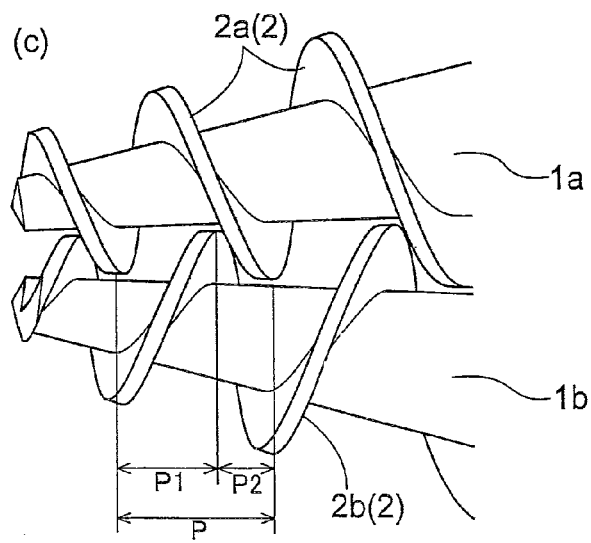
(c)

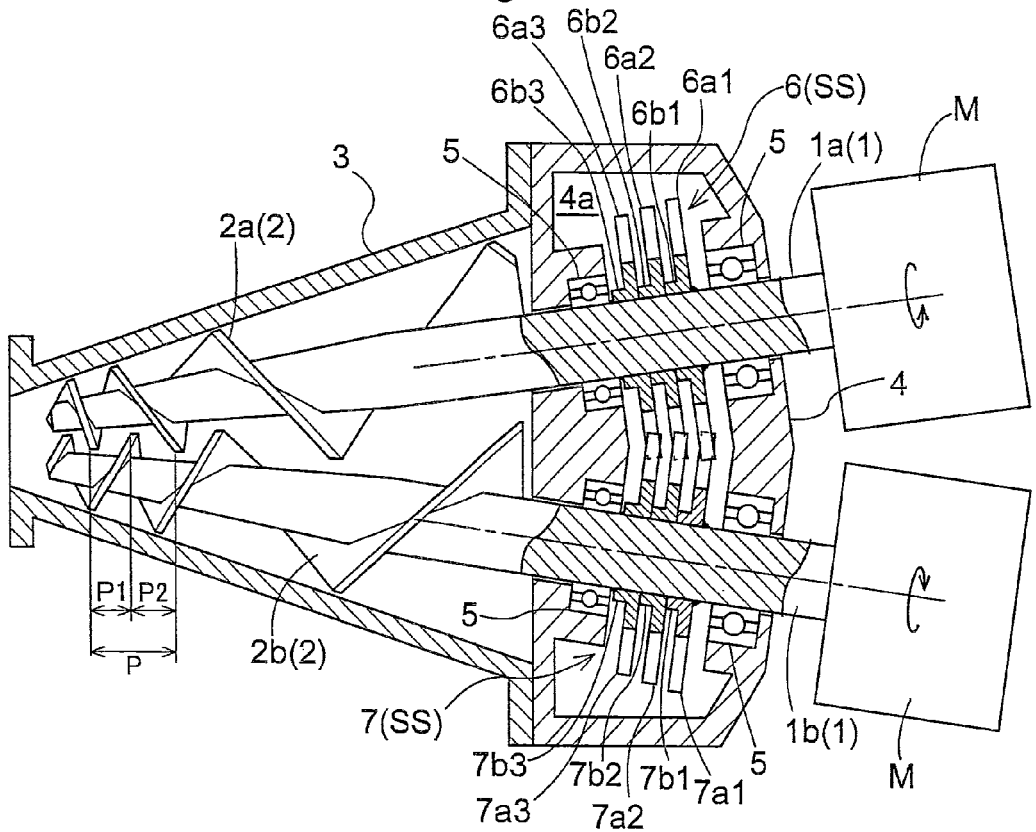
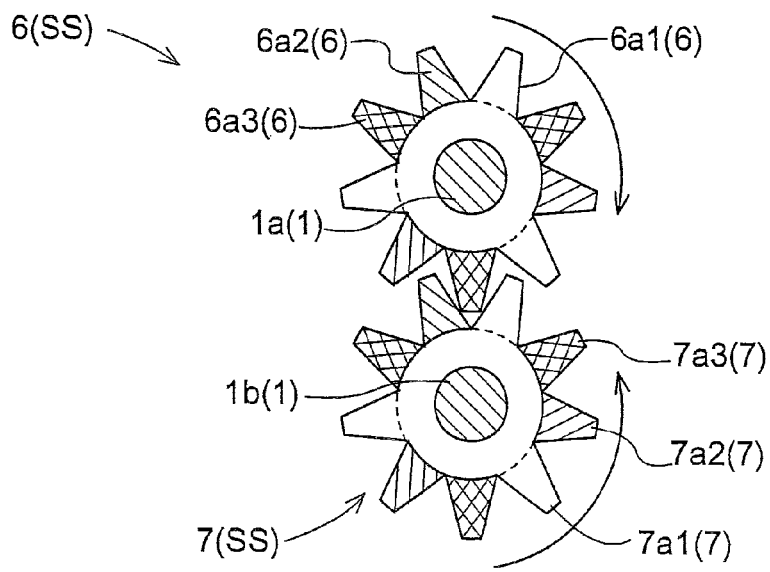

PRIOR ART

TWO-SHAFT EXTRUDER WITH SCREW BLADE CONTACT PREVENTING MECHANISM

BACKGROUND OF THE INVENTION

1. Field of the Invention

The present invention relates to a two-shaft extruder comprising a pair of rotor shafts rotatably disposed with a distance therebetween diminishing toward the leading ends thereof, a screw blade mounted to the leading end of each one of the pair of rotor shafts, one screw blade intruding into the pitch of the other screw blade; and a drive unit mounted the base end of each one of the pair of rotor shafts for rotatably driving the rotor shaft associated therewith.

2. Description of the Related Art

Such two-shaft extruder is configured to be capable of extruding an amount of high-viscosity substance such a unformed rubber material, plastic material charged therein while kneading the substance with the screw blades.

Conventionally, with a two-shaft extruder, in general, as shown in FIG. 9, a motor M with a reduction mechanism is mounted as a drive unit to the base end of one rotor shaft 1*a* alone. Whereas, a conical gear 15 is attached to each one of the pair of rotor shafts 1. In operation, as the motor M rotatably drives the one rotor shaft 1*a*, the other rotor shaft 1*b* is rotated in association therewith through the meshing engagement between the pair of conical gears 15. In contrast, there has been proposed a different type designed to allow use of more inexpensive conical gears through reduction of the load applied to the pair of conical gears 15 for transmitting the rotational drive force, in which a drive unit for rotatably driving a rotor shaft is mounted to the base end of each one of the pair of rotor shafts and a pair of conical gears are provided to the pair of rotor shafts respectively, such that the pair of drive units drive the pair of rotor shafts respectively in synchronism with each other through meshing engagement between the conical gears while avoiding contact between the screw blades of the rotor shafts (see e.g. Patent Document 1).
Patent Document 1; Japanese Patent Application "Kokai" No. Hei. 9-164578.

SUMMARY OF THE INVENTION

With the conventional two-shaft extruders, although differing in one transmitting drive force of one rotor shaft to the other rotor shaft, the other synchronizing each one of the pair of rotor shafts, both these extruders require that conical gears having complicated contours and requiring high working precision be provided on the pair of rotor shafts respectively; hence, there was room for improvement.

Further, the conical gear requires a gear box for oil bathing with lubricant oil because of the constant meshing between the gears, and provision of the gear box leads to need to provide separately a mechanism for preventing the lubricant oil of the gear box from entering the housing. In these ways, the constructions would tend to be complicated.

The present invention has been made in view of the above-described state of the art and its object is to provide a two-shaft extruder having simple construction, yet capable of efficient and effective extrusion.

A two-shaft extruder relating to the present invention comprises a pair of rotor shafts rotatably disposed with a distance therebetween diminishing toward the leading ends thereof, a screw blade mounted to the leading end of each one of the pair of rotor shafts, one screw blade intruding into the pitch of the other screw blade; and a drive unit mounted the base end of each one of the pair of rotor shafts for rotatably driving the rotor shaft associated therewith. According to the first characterizing feature, there is provided a screw blade contact preventing mechanism configured to allow a predetermined phase difference between the pair of rotor shafts, while inhibiting a phase difference greater than the predetermined phase difference when the pair of rotor shafts are rotatably driven respectively.

That is, since there is provided a screw blade contact preventing mechanism configured to allow a predetermined phase difference between the pair of rotor shafts, while inhibiting a phase difference greater than the predetermined phase difference when the pair of rotor shafts are rotatably driven respectively, it becomes possible to simplify the construction by e.g. omitting the conical gears. And, at the same time, with setting, as the predetermined phase difference, such an appropriate phase difference as to be capable of inhibiting inadvertent contact between the screw blades, efficient and effective extrusion is made possible with prevention of mutual contact between the screw blades.

Further, due to the possibility of omitting the conical gears, the gear box for lubricant oil bathing and the mechanism for preventing entrance of lubricant oil of the gear box into the housing can be omitted also, so that the construction can be further simplified.

According to the second characterizing feature of the present invention, in addition to the first characterizing feature described above, said screw blade contact preventing mechanism includes:

a first abutment member comprised of a plurality of projecting portions formed in one rotor shaft along the peripheral direction thereof and equidistantly or substantially equidistantly from each other; and a second abutment member comprised of a plurality of projecting portions formed in the other rotor shaft along the peripheral direction thereof and equidistantly or substantially equidistantly from each other;

a path of the projecting portions of the first abutment member and a path of the projecting portions of the second abutment member are configured to interfere with each other; and between a projecting portion of the first abutment member and a projecting portion of the second abutment member peripherally opposed thereto, there is provided a gap for allowing the predetermined phase difference between the pair of rotor shafts, while inhibiting a phase difference greater than the predetermined phase difference.

That is, since a gap is provided between a projecting portion of the first abutment member and a projecting portion of the second abutment member peripherally opposed thereto, no meshing engagement occurs between the projecting portion of the first abutment member and the projecting portion of the second abutment member peripherally opposed thereto. Hence, the first abutment member and the second abutment member can be provided by a simple work not requiring high precision, i.e. the work of providing a plurality of projecting portions in peripheral juxtaposition on each rotor shaft.

Moreover, since a greater than predetermined amount phase difference is prevented between the pair of rotor shafts through the abutment between a projecting portion of the first abutment member and a projecting portion in the second abutment member peripherally opposed thereto, inadvertent contact or collision between the screw blades can be prevented, thus making effective and efficient extruding operation possible.

In addition, as the projecting portion of the first abutment member moves within the gap provided between this projecting portion and the peripherally opposed projecting portion of the second abutment member, the predetermined phase difference between the pair of rotor shafts is allowed. Therefore, the distance in the longitudinal direction of each rotor shaft between one screw blade and the other screw blade intruding into the pitch of the one screw blade varies. With this arrangement, there can be expected achievement of such advantageous effects as enhanced kneading effect for further kneading an amount of highly viscous substance entrapped between these screw blades, a cleaning effect of removing any amount of highly viscous substance adhering to the rotor shaft by the peripheral edge of the screw blade moving along the rotor shaft.

According to the third characterizing feature of the present invention, in addition to the second characterizing feature described above, a plurality of sets of the first abutment members and the second abutment members are provided along the longitudinal direction of each rotor shaft;

the projecting portions of the first abutment member belonging in a certain set are made different in position peripherally as seen in the axial direction of the one rotor shaft than the projecting portions of the first abutment member belonging in another set adjacent thereto; and the projecting portions of the second abutment member belonging in a certain set are made different in position peripherally as seen in the axial direction of the other rotor shaft than the projecting portions of the second abutment member belonging in another set adjacent thereto.

That is, since a plurality of sets of the first abutment members and the second abutment members are provided along the longitudinal direction of each rotor shaft, the projecting portions of the first abutment member belonging in a certain set are made different in position peripherally as seen in the axial direction of the one rotor shaft than the projecting portions of the first abutment member belonging in another set adjacent thereto and the projecting portions of the second abutment member belonging in a certain set are made different in position peripherally as seen in the axial directing portion of the other rotor shaft than the projecting portions of the second abutment member belonging in another set adjacent thereto, even if a projecting portion of the first abutment member of a certain set inadvertently fails to abut the second abutment member of that set and bypasses it via the gap, the projecting portion of the first abutment member belonging in the adjacent set will abut the second abutment member in that set, thus preventing a phase difference greater than the predetermined phase difference between the pair of rotor shafts, thus reliably preventing the phase difference between the pair of rotor shafts from becoming greater than the predetermined phase difference.

According to the fourth characterizing feature of the present invention, in addition to the second or third characterizing feature described above, the extruder further comprises:

a rotational speed detecting means for detecting a rotational speed of each one of the first abutment member and the second abutment member; and a controlling means for calculating a cycle ratio between the cycle of the first abutment member and the cycle of the second abutment member from the rotational speeds detected by the rotational speed detecting means and also for executing synchronization control scheme for each one of the pair of drive units such that said cycle ratio becomes equal to 1 (one).

That is, since there are provided a rotational speed detecting means for detecting a rotational speed of each one of the first abutment member and the second abutment member and a controlling means for calculating a cycle ratio between the cycle of the first abutment member and the cycle of the second abutment member from the rotational speeds detected by the rotational speed detecting means and also for executing synchronization control scheme for each one of the pair of drive units such that said cycle ratio becomes equal to 1 (one), in comparison with an alternative arrangement wherein a phase difference between the pair of rotor shafts is detected by a position detecting means such as a rotary encoder and the respective rotational speeds of the pair of rotor shafts are detected by a rotational speed detecting means such as a tachometer and synchronization control scheme is executed for each one of the drive units such that the phase difference between the pair of rotor shafts becomes equal to 0 (zero), the position detecting means can be omitted. Moreover, the synchronization control is made possible with the simple control scheme of calculating the cycle ratio between the cycle of the first abutment member and the cycle of the second abutment member and rendering this cycle ratio 1 (one).

According to the fifth characterizing feature of the present invention, in addition to the fourth characterizing feature described above, the extruder further comprises:

a phase difference generating commanding means for issuing a phase difference generating command; and wherein in response to input of the phase difference generating command to said phase difference generating commanding means, said controlling means executes a phase difference generating control scheme for each one of the pair of drive units with priority over said synchronization control scheme such that the predetermined phase difference is generated between the pair of rotor shafts.

Since there is provided a phase difference generating commanding means for issuing a phase difference generating command and in response to input of the phase difference generating command to said phase difference generating commanding means, said controlling means executes a phase difference generating control scheme for each one of the pair of drive units with priority over said synchronization control scheme such that the predetermined phase difference is generated between the pair of rotor shafts, by causing the phase difference generating command by the phase difference generating commanding means, it is possible to positively cause the above-described enhanced kneading effect and the cleaning effect to be provided as needed.

BRIEF DESCRIPTION OF THE DRAWINGS

FIG. 3 is a view showing screw blades and rotor shafts, FIG. 7 is a general plane view showing a two-shaft extruder according to a third embodiment, FIG. 8 is a front view showing a set of a first abutment member and a second abutment member in the third embodiment.

DETAILED DESCRIPTION OF THE INVENTION

First Embodiment

Next, a two-shaft extruder relating to the present invention will be described.

Figure 1:
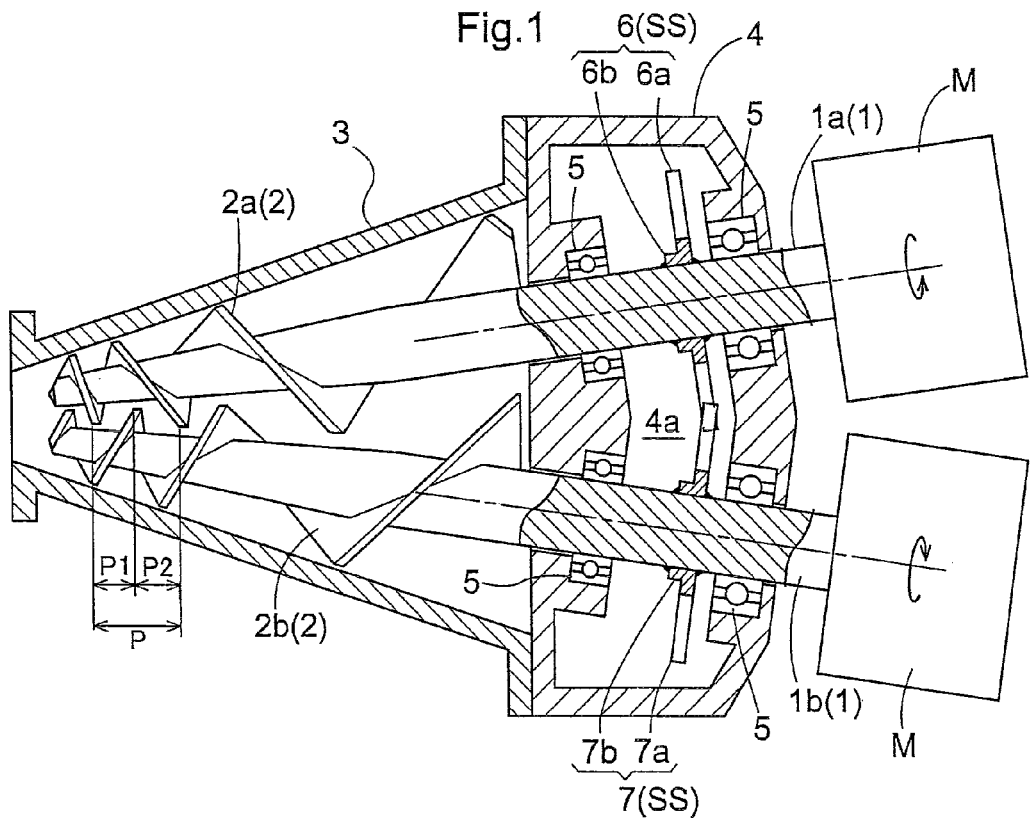
FIG. 1 is a general plane view of a two-shaft extruder according to a first embodiment.
Figure 2:
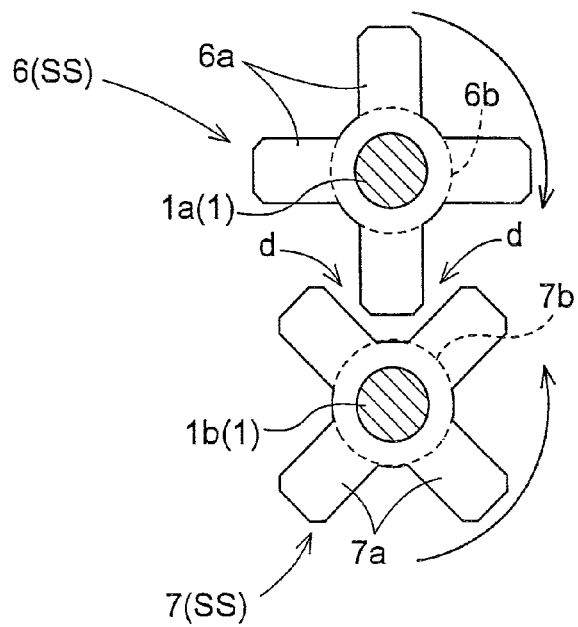
FIG. 2 is a front view showing a first abutment member and a second abutment member in the first embodiment.

As shown in FIG. 1 and FIG. 2, a two-shaft extruder is for use in extruding an amount of high-viscosity substance such as un-formed rubber material, plastic material which has been kneaded by a kneading machine such as a mixer, a kneader, etc. The two-shaft extruder includes such components as a pair of rotor shafts 1 rotatably disposed with a distance therebetween diminishing toward the leading ends thereof, a pair of screw blades 2 mounted to the respective leading ends of the pair of rotor shafts 1, a pair of motors M with reduction mechanism provided at the respective base ends of the pair of rotor shafts 1 as a pair of drive units for rotatably driving the rotor shafts 1 respectively, and so on.

Each rotor shaft 1 has an approximately cylindrical shape with a tapered leading end. The screw blade 2 is configured as a variable pitch type having its pitch width P progressively decreasing toward the leading end and its flight height reducing toward the same. Between the paired rotor shafts 1, the other screw blade 2b intrudes into the pitch P of one screw blade 2a and the one screw blade 2a intrudes into the pitch P of the other screw blade 2b so that the peripheral edge of the screw blade 2 is disposed in close vicinity of the outer peripheral face of the rotor shaft 1. A housing 3 is provided for accommodating therein the rotor shafts 1 and the screw blades 2. And, an amount of high-viscous substance or material can be charged from above the housing 3. To the base end of this housing 3, there is mounted an extruder main body 4. The base ends of the rotor shafts 1 extend through the extruder main body 4 and bearings 5 are provided between base ends of the rotor shafts 1 and the extruder main body 4, so that the extruder main body 4 rotatably supports the rotor shafts 1. And, at positions offset toward the base ends from the center portions of the rotor shafts 1, there are mounted a first abutment member 6 and a second abutment member 7 to be described later.

The first abutment member 6 and the second abutment member 7 are provided in an inner space 4a of the extruder main body 4. The first abutment member 6 is constituted of a plurality of projecting portions 6a formed on one rotor shaft 1a equidistantly in the peripheral direction. The second abutment member 7 is constituted of a plurality of projecting portions 7a formed on the other rotor shaft 1b equidistantly in the peripheral direction. And, arrangement is provided such that the path of the projecting portions 6a of the first abutment member 6 and the path of the projecting portions 7a of the second abutment member 7 interfere with each other. Between a projecting portion 6a of the first abutment member 6 and a projecting portion 7a of the second abutment member 7 peripherally opposed thereto, there is provided a gap (d) for allowing a predetermined phase difference between the pair of rotor shafts 1, while preventing any phase difference greater than the predetermined phase difference. These together constitute a screw blade contact preventing mechanism SS for allowing a predetermined phase difference between the pair of rotor shafts 1, while preventing any phase difference greater than the predetermined phase difference, when the pair of rotor shafts 1 are rotatably driven respectively.

Referring more particularly, the first abutment member 6 comprises four projecting portions 6a formed peripherally equidistantly on a cylindrical boss portion 6b attached to the one rotor shaft 1a, each projecting portion 6a having a rectangular plate-like shape with one corner removed therefrom. Similarly, the second abutment member 7 comprises four projecting portions 7a formed peripherally equidistantly on a cylindrical boss portion 7b attached to the other rotor shaft 1b, each projecting portion 7a having a rectangular plate-like shape with one corner removed therefrom.

And, as shown in FIG. 1, FIG. 2 and FIG. 3, if the other rotor shaft 1b is rotated forwardly while the one rotor shaft 1a is stopped in its rotation thereby to provide a phase difference of 60-degree advanced (see FIG. 3 (b)) from the normal phase (see FIG. 3 (a)) between the pair of rotor shafts 1, the projecting portion 7a of the second abutment member 7 mounted on the other rotor shaft 1b is moved in the gap (d) provided between this projecting portion 7a and the projecting portion 6a of the first abutment member 6 peripherally opposed thereto, thereby allowing a predetermined phase difference between these paired rotor shafts 1. Therefore, distances P1, P2 longitudinally of the respective rotor shaft 1 between the one screw blade 2a and the other screw blade 2b intruding into the pitch P of the one screw blade 2a will vary, thereby to provide an enhanced kneading effect for providing enhanced kneading of an amount of high-viscous substance entrapped between these screw blades 2 and the cleaning effect of the peripheral edge of the screw blade 2 moving along the outer peripheral face of the rotor shaft 1 to remove or scrape off an amount of high-viscous substance adhering to this rotor shaft 1. At the same time, as the projecting portion 7a of the second abutment member 7 comes into abutment against the projecting portion 6a of the first abutment member 6 peripherally opposed thereto, thereby to prevent any phase difference greater than the predetermined phase difference between the pair of rotor shafts 1. Therefore, inadvertent contact or collision between the screw blade 2 can be effectively prevented and the extrusion operation can proceed in a smooth and effective manner. Incidentally, though not discussed in details, similar effects can be expected to be obtained also when the other rotor shaft 1b is rotated in reverse while the one rotor shaft 1a is stopped in its rotation, thus providing a phase difference of 60 degrees lagged from the normal phase (see FIG. 3 (a)) between the pair of rotor shafts 1 (see FIG. 3 (c)).

It should be noted here that the predetermined phase difference between the pair of rotor shafts 1 is not limited to the 60 degrees phase difference described above, but may vary as desired and/or appropriately, in accordance with such factors as the torsion angle, the flight height of the screw blade 2.

Next, a control construction of the two-shaft extruder will be explained additionally.

Figure 4:
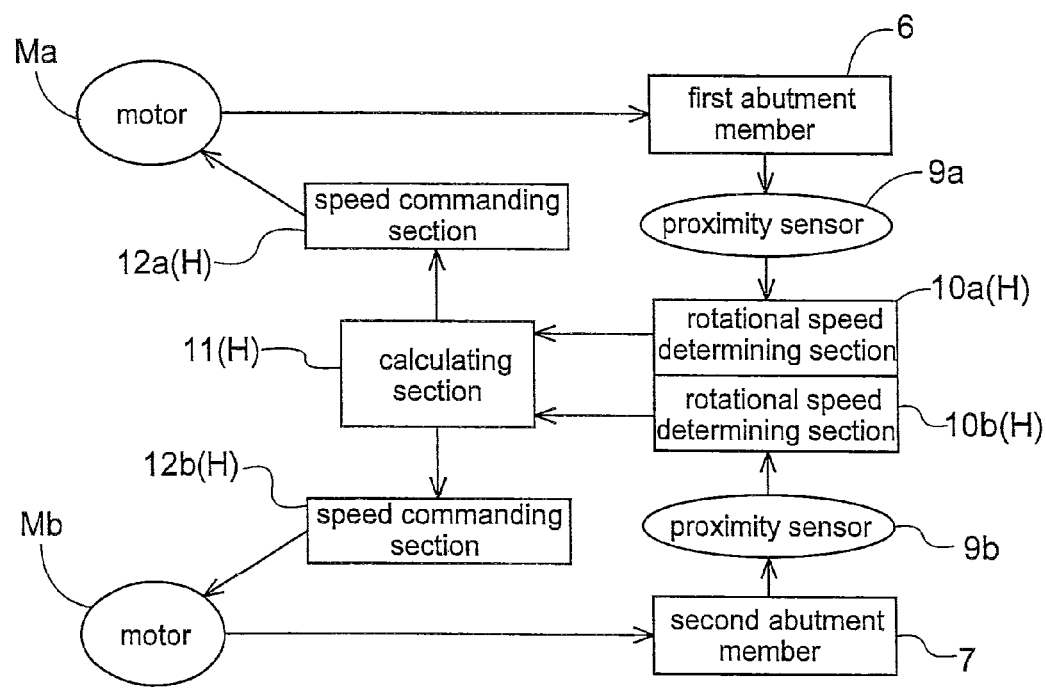
FIG. 4 is a control block diagram.

As shown in FIG. 4, the construction includes an unillustrated command switch as a phase difference generating commanding means for issuing a phase difference generating command, one proximity sensor 9a disposed in close proximity of the projecting portion 6a of the first abutment member 6, one rotational speed determining section 10a for determining a rotational speed of the first abutment member 6 based on detection information from the proximity sensor 9a and an unillustrated timer, the other proximity sensor 9b disposed in close proximity of the projecting portion 7a of the second abutment member 7, the other rotational speed determining section 10b for determining a rotational speed of the second abutment member 7 based on detection information from the proximity sensor 9b and an unillustrated timer. The construction further includes a calculating section 11 for calculating a cycle ratio Ta/Tb between a cycle Ta of the first abutment member 6 and a cycle Tb of the second abutment member 7, based on the rotational speeds of the first and second abutment members 6, 7 detected by the rotational speed determining sections 10a, 10b, respectively, one speed commanding section 12a for issuing, to one motor Ma, a speed increasing/decreasing command for increasing/decreasing the rotational speed of this one motor Ma based on the cycle ratio Ta/Tb calculated by the calculating section 11, and the other speed commanding section 12b for issuing, to the other motor Mb, a speed increasing/decreasing command for increasing/decreasing the rotational speed of this other motor Mb based on the cycle ratio Ta/Tb calculated by the calculating section 11.

Therefore, the proximity sensors 9a, 9b and the rotational speed determining sections 10a, 10b together constitute "a rotational speed detecting means" for detecting rotational speeds of the first abutment member 6 and the second abutment member 7. The rotational speed determining sections 10a, 10b, the calculating section 11, and the speed commanding sections 12a, 12b together constitute a controlling apparatus H as "a controlling means" for controlling drives of the pair of motors M respectively, based on the detection information from the proximity sensors 9a, 9b.

And, when no phase difference generating command is inputted thereto by the commanding switch, the controlling apparatus H calculates the cycle ratio Ta/Tb between the cycle Ta of the first abutment member 6 and the cycle Tb of the second abutment member 7 based on the rotational speeds detected by the rotational speed detecting means and also issues a speed increasing/decreasing command to the pair of motors M respectively so that the cycle ratio Ta/Tb may become 1 (one), thereby to execute a synchronization control scheme for driving the pair of motors M respectively. Whereas, if a phase difference generating command is inputted thereto by the commanding switch, the controlling apparatus H issues a speed increasing/decreasing command to the pair of motors M respectively so as to execute a phase difference generating control scheme in such a manner as to generate the predetermined phase difference between the pair of rotor shafts 1, with priority over the synchronization control scheme described above. Therefore, under the normal condition, the pair of motors M are synchronized with each other and as a worker, monitoring the conditions of the rotor shafts 1 and/or the screw blades 2, will operate the commanding switch to issue the phase difference generating command, so that an enhanced kneading effect and/or cleaning effect can be provided as needed or desired.

Referring more specifically, in the absence of input of the phase difference generating command by the commanding switch, for instance, the first abutment member 6 will be rotated by ¼ rotation and the one proximity sensor 9a detects the cycle (0.25 Ta) of the first abutment member 6. When the second abutment member 7 is rotated by ¼ rotation and the other proximity sensor 9b detects the cycle (0.25 Tb) of the second abutment member 7. The controlling apparatus will calculate the cycle ratio Ta/Tb between the cycle (0.25Ta) in the case of the ¼ rotation of the first abutment member 6 and the cycle (0.25 Tb) in the case of the ¼ rotation of the second abutment member 7. Then, if this cycle ratio Ta/Tb is smaller than 1, that is, the phase of the first abutment member 6 has advanced at the time of the ¼ rotations of the first abutment member 6 and the second abutment member 7, speed increasing/decreasing commands will be issued respectively to the pair of motors M so that the cycle ratio Ta/Tb between the cycle (0.5 Ta) at the time of ½ rotation of the first abutment member 6 and the cycle (0.5 Tb) at the time of ½ rotation of the second abutment member 7 may become 1 (one). When a phase difference generating command is issued by the commanding switch, the speed increasing/decreasing commands are issued to the respective motors M so as to generate the predetermined phase difference between the pair of rotor shafts 1.

Second Embodiment

In this embodiment, only differences thereof from the first embodiment will be discussed, with discussion of the identical parts and arrangements to those in the first embodiment being omitted.

Next, there will be described a screw blade contact preventing mechanism SS relating to the present invention.

Figure 5:
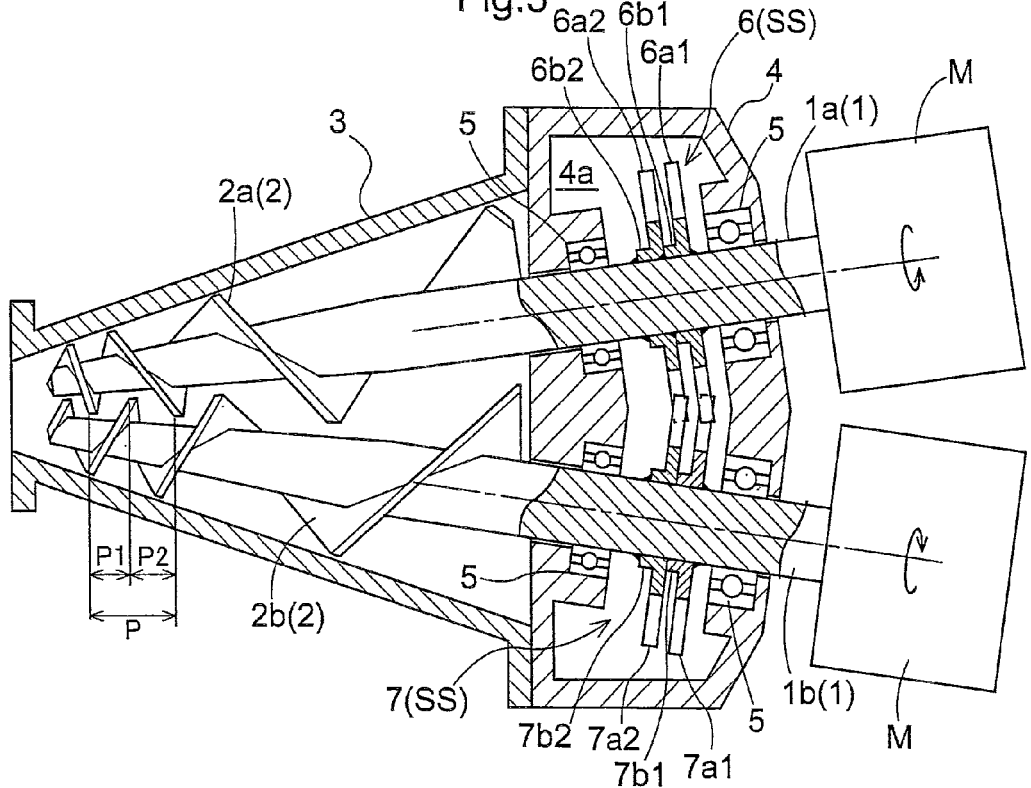
FIG. 5 is a general plane view showing a two-shaft extruder according to a second embodiment.
Figure 6:
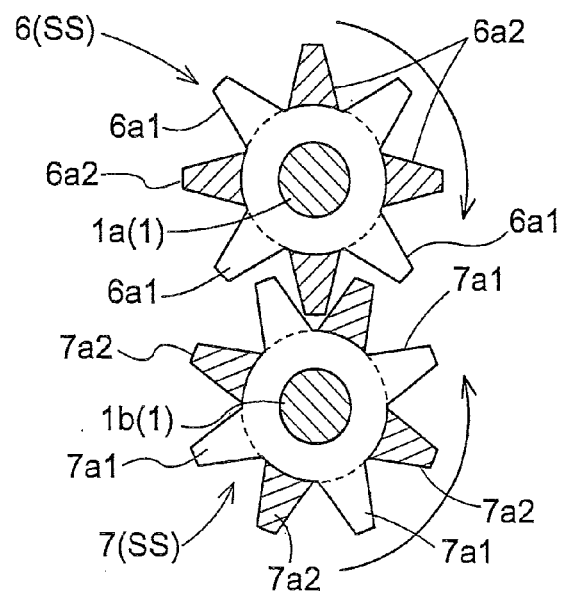
FIG. 6 is a front view showing a set of a first abutment member and a second abutment member in the second embodiment.
Figure 9:
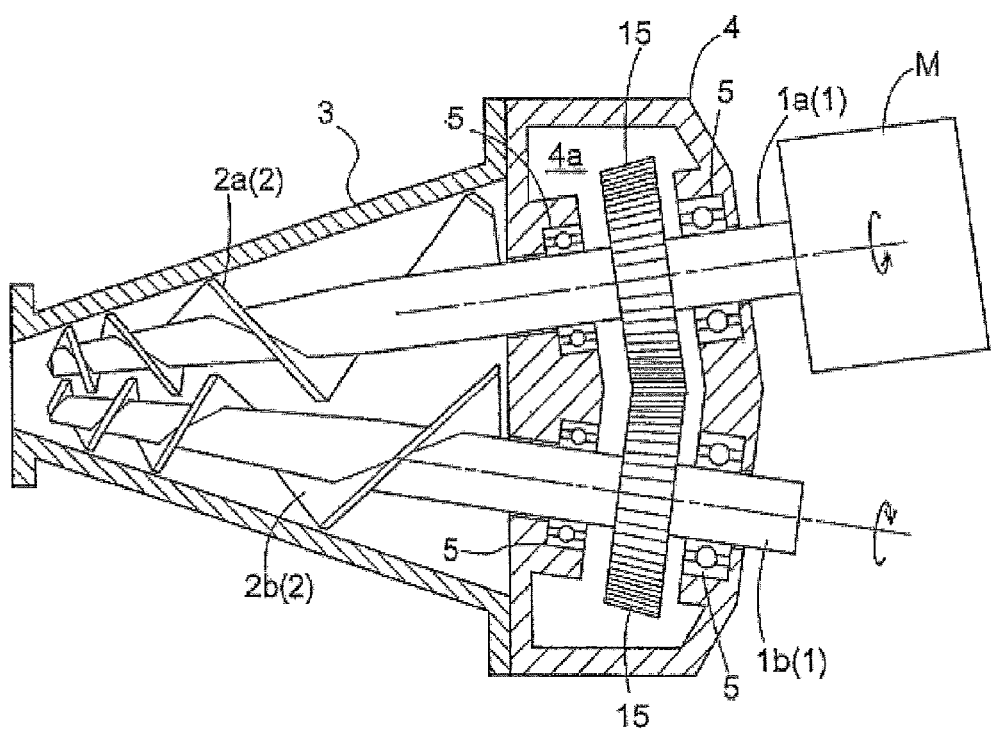
FIG. 9 is a general plane view showing a two-shaft extruder having a conventional construction.

As shown in FIG. 5 and FIG. 6, two sets of the first abutment members 6 and the second abutment members 7 are provided along the longitudinal direction of each rotor shaft 1 (that is, the direction along the bisector dividing the internal angle formed between the pair of rotor shafts 1 into two equal angles). And, the positions of projecting portions 6a1 of the first abutment member 6 belonging to the base end side set (outline portions in FIG. 6) and the positions of projecting portions 6a2 of the first abutment member 6 belonging to the leading end side set (shaded line portions in FIG. 6) adjacent to the base end side set are rendered different from each other in the peripheral direction as seen along the axis of the one rotor shaft. Similarly, the positions of projecting portions 7a1 of the second abutment member 7 belonging to the base end side set and the positions of projecting portions 7a2 of the second abutment member 7 belonging to the leading end side set adjacent to the base end side set are rendered different from each other in the peripheral direction as seen along the axis of the other rotor shaft.

More particularly, the first abutment member 6 belonging to the base end side set comprise four trapezoidal-shaped projecting portions 6a1 peripherally equidistantly disposed on a cylindrical boss portion 6b1 mounted on the one rotor shaft 1a. The first abutment member 6 belonging to leading end side set comprise four trapezoidal-shaped projecting portions 6a2 peripherally equidistantly disposed on a cylindrical boss portion 6b2 mounted on the one rotor shaft 1a. The second abutment member 7 belonging to the base end side set comprise four trapezoidal-shaped projecting portions 7a1 peripherally equidistantly disposed on a cylindrical boss portion 7b1 mounted on the other rotor shaft 1b. The second abutment member 7 belonging to the leading end side set comprise four trapezoidal-shaped projecting portions 7a2 peripherally equidistantly disposed on a cylindrical boss portion 7b2 mounted on the other rotor shaft 1b.

And, the first abutment member 6 belonging to the base end side set and the first abutment member 6 belong to the leading end side set are disposed with a phase difference of 45 degrees between these first abutment members 6 as seen along the axial direction of the one rotor shaft. And, the second abutment member 7 belonging to the base end side set and the second abutment member 7 belong to the leading end side set are disposed with a phase difference of 45 degrees between these second abutment members 7 as seen along the axial direction of the other rotor shaft.

Incidentally, the phase difference to be provided between the first abutment members 6 or between the second abutment members 7 is not limited to the 45 degree phase difference described above. However, such angle (45 degrees) is preferred in view of reliably preventing a phase difference (e.g. about 60 degrees) greater than the predetermined phase difference between the pair of rotor shafts.

Third Embodiment

In this embodiment, only differences thereof from the first embodiment will be discussed, with discussion of the identical parts and arrangements to those in the first embodiment being omitted.

Next, there will be described a screw blade contact preventing mechanism SS relating to the present invention.

As shown in FIG. 7 and FIG. 8, three sets of the first abutment members 6 and the second abutment members 7 are provided along the longitudinal direction of each rotor shaft 1. And, the positions of projecting portions 6a1 of the first abutment member 6 belonging to the base end side set (outline portions in FIG. 8) and the positions of projecting portions 6a2 of the first abutment member 6 belonging to the intermediate side set (shaded portions in FIG. 8) adjacent to the base end side set and the positions of projecting portions 6a3 of the first abutment member 6 belonging to the leading end side set (meshed portions in FIG. 8) adjacent to the intermediate side set are rendered different from each other in the peripheral direction as seen along the axis of the one rotor shaft. Similarly, the positions of projecting portions 7a1 of the second abutment member 7 belonging to the base end side set and the positions of projecting portions 7a2 of the second abutment member 7 belonging to the intermediate side set adjacent to the base end side set and the positions of the projecting portions 7a3 of the second abutment member 7 belonging to the leading end side set adjacent to the intermediate side set are rendered different from each other in the peripheral direction as seen along the axis of the other rotor shaft.

More particularly, the first abutment member 6 belonging to the base end side set comprise three trapezoidal-shaped projecting portions 6a1 peripherally equidistantly disposed on a cylindrical boss portion 6b1 mounted on the one rotor shaft 1a. The first abutment member 6 belonging to the intermediate side set comprise three trapezoidal-shaped projecting portions 6a2 peripherally equidistantly disposed on a cylindrical boss portion 6b2 mounted on the one rotor shaft 1a. The first abutment member 6 belonging to the leading end side set comprise three trapezoidal-shaped projecting portions 6a3 peripherally equidistantly disposed on a cylindrical boss portion 6b3 mounted on the one rotor shaft 1a. The second abutment member 7 belonging to the base end side set comprise three trapezoidal-shaped projecting portions 7a1 peripherally equidistantly disposed on a cylindrical boss portion 7b1 mounted on the other rotor shaft 1b. The second abutment member 7 belonging to the intermediate side set comprise three trapezoidal-shaped projecting portions 7a2 peripherally equidistantly disposed on a cylindrical boss portion 7b2 mounted on the other rotor shaft 1b. The second abutment member 7 belonging to the leading end side set comprise three trapezoidal-shaped projecting portions 7a3 peripherally equidistantly disposed on a cylindrical boss portion 7b3 mounted on the other rotor shaft 1b.

And, the first abutment member 6 belonging to the base end side set and the first abutment member 6 belong to the intermediate side set and the first abutment member 6 belong to the leading end side set are disposed with a phase difference of 40 degrees between these first abutment members 6 as seen along the axial direction of the one rotor shaft. And, the second abutment member 7 belonging to the base end side set and the second abutment member 7 belonging to the intermediate side set and the second abutment member 7 belong to the leading end side set are disposed with a phase difference of 40 degrees between these second abutment members 7 as seen along the axial direction of the other rotor shaft.

Incidentally, the number of the sets of the first abutment members 6 and the second abutment members 7 is not limited to 2 or 3, but may be more. In such case, an arrangement will be made such that the first abutment member 6 of each one of the plurality of sets is disposed with an offset in phase as seen in the direction of the one rotor shaft axis by an angle obtained by dividing the angle formed between its projecting portions 6a peripherally adjacent each other by the number of the sets of the first abutment members 6. And, similarly, an arrangement will be made such that the second abutment member 7 of each one of the plurality of sets is disposed with an offset in phase as seen in the other rotor shaft axis by an angle obtained by dividing the angle formed between its projecting portions 7a peripherally adjacent each other by the number of the sets of the second abutment members 7. With provision of such large number of sets of the first abutment members 6 and the second abutment members 7, even a phase difference greater than the predetermined phase difference between the pair of rotor shafts can be prevented in even more reliable manner.

Other Embodiments (1) In the foregoing embodiments, there have been described the arrangements wherein a plurality of projecting portions 6a are disposed with equal peripheral distance from each other on one rotor shaft 1a and a plurality of projecting portions 7a are disposed with equal peripheral distance from each other on the other rotor shaft 1b. The present invention is not limited thereto. Alternative arrangements may be employed wherein a plurality of projecting portions 6a are disposed with substantially equal peripheral distance from each other on one rotor shaft 1a and a plurality of projecting portions 7a are disposed with substantially equal peripheral distance from each other on the other rotor shaft 1b.

(2) In the foregoing embodiments, one proximity sensor 9a detects the projecting portion 6a of the first abutment member 6 and the other proximity sensor 9b detects the projecting portion 7a of the second abutment member 7. Instead of this construction, one proximity sensor 9a may detect the projecting portion 6a of the first abutment member 6 whereas the other proximity sensor 9b detects a dog (a detection target element) provided in the second abutment member 7. With this arrangement, it becomes possible to match the detection timings of the proximity sensors 9a, 9b each other.

(3) In the foregoing embodiments, the projecting portion 6a of the first abutment member 6 and the projecting portion 7a of the second abutment member 7 are formed like a rectangular plate with a corner thereof removed or in the trapezoidal form. The invention is not limited thereto. Instead, these projecting portions may be provided in the form of a triangle shape having straight lateral sides or a tapered shape having lateral sides thereof comprised of curves such as involutes, etc.

the present invention is useful as a two-shaft extruder having simple construction, yet capable of efficient and effective extrusion.

The invention claimed is:

1. A two-shaft extruder comprising:
   a pair of rotor shafts rotatably disposed with a distance therebetween diminishing toward the leading ends thereof; and
   a screw blade mounted to the leading end of each one of the pair of rotor shafts, one screw blade intruding into the pitch of the other screw blade; and a drive unit mounted the base end of each one of the pair of rotor shafts for rotatably driving the rotor shaft associated therewith without the use of conical gears for synchronizing the drive of the pair of rotor shafts;

wherein there is provided a screw blade contact preventing mechanism configured to allow a predetermined phase difference between the pair of rotor shafts, while inhibiting a phase difference greater than the predetermined phase difference when the pair of rotor shafts are rotatably driven respectively, wherein said screw blade contact preventing mechanism includes:

a first abutment member comprised of a plurality of projecting portions formed in one rotor shaft along the peripheral direction thereof and equidistantly or substantially equidistantly from each other; and a second abutment member comprised of a plurality of projecting portions formed in the other rotor shaft along the peripheral direction thereof and equidistantly or substantially equidistantly from each other;

a path of the projecting portions of the first abutment member and a path of the projecting portions of the second abutment member are configured to interfere with each other; and between a projecting portion of the first abutment member and a projecting portion of the second abutment member peripherally opposed thereto, there is provided a gap for allowing the predetermined phase difference between the pair of rotor shafts, while inhibiting a phase difference greater than the predetermined phase difference.

2. The two-shaft extruder according to claim 1, wherein a plurality of sets of the first abutment members and the second abutment members are provided along the longitudinal direction of each rotor shaft;

the projecting portions of the first abutment member belonging in a certain set are made different in position peripherally as seen in the axial direction of the one rotor shaft than the projecting portions of the first abutment member belonging in another set adjacent thereto; and the projecting portions of the second abutment member belonging in a certain set are made different in position peripherally as seen in the axial direction of the other rotor shaft than the projecting portions of the second abutment member belonging in another set adjacent thereto.

3. The two-shaft extruder according to claim 2, wherein the extruder further comprises:

a rotational speed detecting means for detecting a rotational speed of each one of the first abutment member and the second abutment member; and a controlling means for calculating a cycle ratio between the cycle of the first abutment member and the cycle of the second abutment member from the rotational speeds detected by the rotational speed detecting means and also for executing synchronization control scheme for each one of the pair of drive units such that said cycle ratio becomes equal to 1 (one).

4. The two-shaft extruder according to claim 1, wherein the extruder further comprises:

a rotational speed detecting means for detecting a rotational speed of each one of the first abutment member and the second abutment member; and a controlling means for calculating a cycle ratio between the cycle of the first abutment member and the cycle of the second abutment member from the rotational speeds detected by the rotational speed detecting means and also for executing synchronization control scheme for each one of the pair of drive units such that said cycle ratio becomes equal to 1 (one).

5. The two-shaft extruder according to claim 4, wherein the extruder further comprises:

a phase difference generating commanding means for issuing a phase difference generating command; and wherein in response to input of the phase difference generating command to said phase difference generating commanding means, said controlling means executes a phase difference generating control scheme for each one of the pair of drive units with priority over said synchronization control scheme such that the predetermined phase difference is generated between the pair of rotor shafts.

* * * * *